Feb. 6, 1934.    S. G. STUCKEY    1,945,871
METHOD OF AND APPARATUS FOR FEEDING MOLTEN GLASS
Filed Feb. 23, 1933
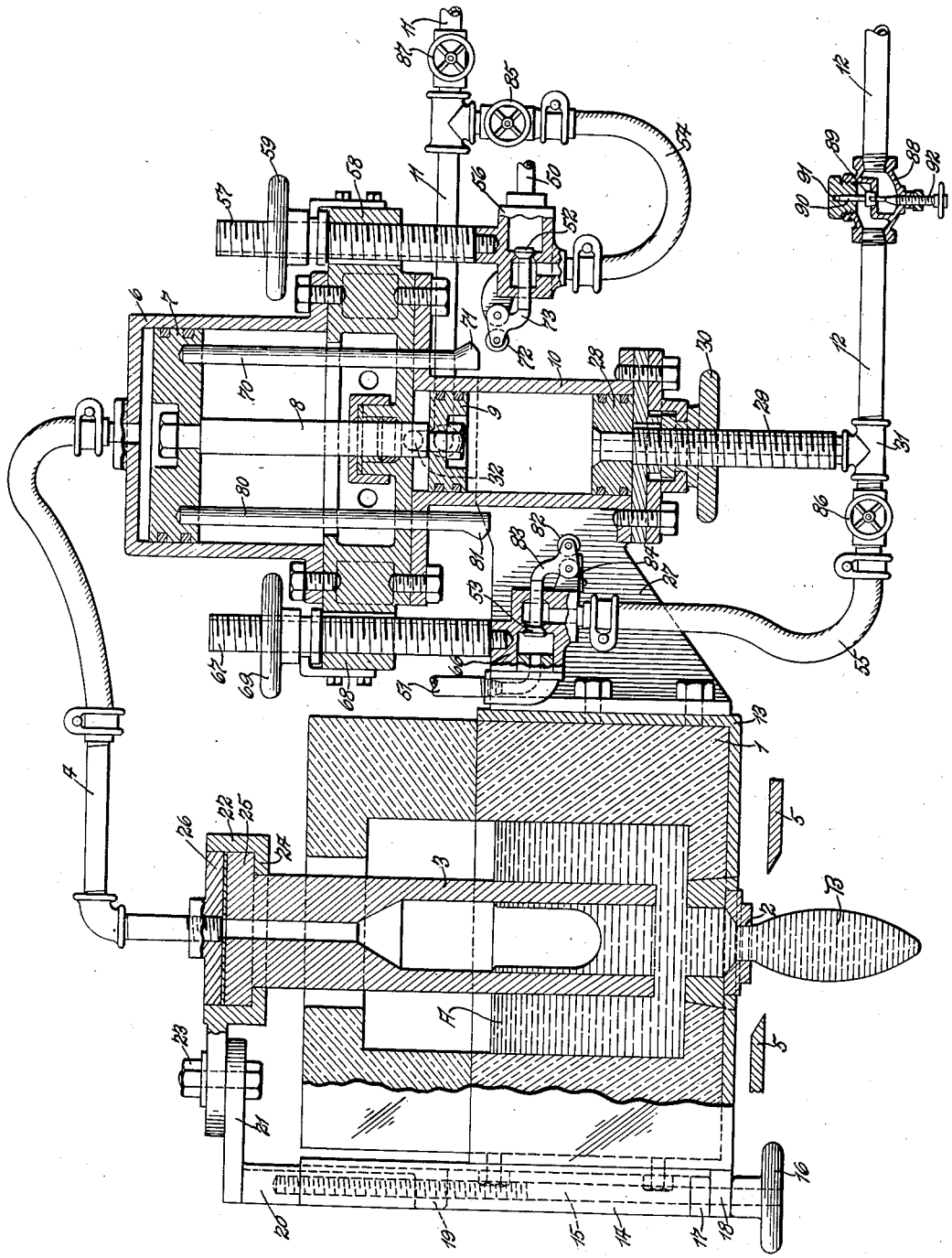
Inventor
Samuel G. Stuckey
by Rippey & Kingsland
His Attorneys Patented Feb. 6, 1934

1,945,871

UNITED STATES PATENT OFFICE

1,945,871

METHOD OF AND APPARATUS FOR FEEDING MOLTEN GLASS

Samuel G. Stuckey, St. Louis, Mo., assignor to Obear-Nester Glass Company, St. Louis, Mo., a corporation of Missouri Application February 23, 1933. Serial No. 658,008

10 Claims. (Cl. 49—55)

This invention relates to the art of feeding mold charges of molten glass, and more particularly to that type of feeders which are air controlled. In this type of feeder a pressure tube is suspended in the forehearth of a melting furnace, above an orifice in the bottom of the forehearth, and the extrusion of molten glass through the orifice is controlled by varying the pressure within the pressure tube, successively and in synchronism with the operation of a pair of shears situated below the orifice and adapted to sever gobs of molten glass to form mold charges. The pressure in the tube may be successively increased above atmospheric pressure, or successively decreased below atmospheric pressure, or both alternately.

One of the objects of this invention is to provide, in the practicing of the method described, a step whereby the shape of the mold charge may be better controlled.

Another object of the invention is to provide mechanism, in connection with apparatus of the class described, whereby the shape of the mold charge may be better controlled.

Another object of the invention is to provide means whereby the velocity of air introduced into the tube, or withdrawn therefrom may be momentarily increased in order to provide a better control of the shape of the mold charge.

Another object of the invention is to provide means whereby better control may be had of the extrusion of the glass in order that the weight of the severed gob will be less affected by changes in temperature of the glass.

Another object of the invention is to provide means whereby a predetermined amount of air may be introduced into or exhausted from the pressure tube, or both, with means for increasing the rate of introduction or withdrawal at a particular point or points in the cycle of operation.

Another object of the invention is to provide means whereby the rate of withdrawal of air from the pressure tube may be varied in relation to the rate of introduction of air into the tube, or vice versa.

Other and specific objects will be apparent from the following detail description, taken in connection with the accompanying drawing, which is a sectional view of apparatus embodying the invention and adapted to perform the process herein described.

The invention has been illustrated in connection with mechanism like that in commercial use and described in Letters Patent No. 1,686,109, issued to me October 2, 1928. It is to be understood, however, that the improvements herein claimed may be used in connection with apparatus differing widely from that illustrated and described.

The apparatus of the prior art consists generally of a forehearth 1 having an orifice 2 at the bottom, a pressure tube 3 supported above the orifice 2 and immersed in the molten glass A. Air is alternately and successively introduced into and exhausted from the pressure tube 3 by means of a conduit 4 connected to the pressure tube. The introduction of air into the pressure tube 3 causes an increased flow of glass through the orifice 2 and the reduction in pressure in the bell retards the flow, as compared with normal gravity flow through the orifice. The result of this operation is the formation, below the orifice, of a suspended gob B, which is severed by shears 5 operated in synchronized relationship with the changes in pressure in the pressure tube 3.

The introduction and withdrawal of the air from the tube 3, through the conduit 4, is accomplished by a pump comprising a cylinder 6 with a piston 7. The piston is driven by mechanism which comprises a piston rod 8, to which is attached at its lower end a piston 9, reciprocating in the cylinder 10. Compressed air is introduced on either side of the piston 9 through conduits 11 and 12.

It is to be understood that timing mechanism is provided for connecting the conduits 11 and 12 with a source of compressed air supply, and for opening the conduits to atmosphere for exhaust, as well as for timing the shears 5. Since such timing mechanism is well understood in the art and constitutes no part of this invention it is not specifically illustrated or described.

Having described the apparatus in general, I may now describe some of the details of that apparatus as it is known in the art.

The forehearth 1 is constructed of refractory material, supported in a frame 13, and is in communication, of course, with a melting furnace not shown. The frame 13 supports a bracket 14, which carries a screw 15, having a hand wheel 16 at its bottom end. The screw 15 has a collar 17 bearing against a lug 18 extending laterally from the lower end of the bracket 14. The screw 15 is threaded into a lug 19 extending from a vertical member 20 guided in the bracket 14. The member 20 is provided with a horizontal arm 21, carrying a support 22 for the tube 3; the support 22 being secured to the arm 21 by a bolt 23. The support 22 is provided with an annular flange 24, through which the body of the tube 3 extends, the tube being provided at its upper end with a flange 25 which rests upon the flange 24. A cover plate 26, for the tube 3, receives the conduit 4 in registry with the bore of the tube. It will thus be seen that the elevation of the tube 3 may be adjusted by turning the hand wheel 16. That is to say, the clearance between the bottom of the tube and the orifice may be readily regulated manually by turning the wheel 16. A bracket 27, secured to the frame 13, supports the pump described above and which includes the cylinder 6 and the piston 7, connecting rod 8, cylinder 10 and its piston 9. An adjustable head 28 is secured in the bottom of the cylinder 10 and by abutment with the piston 9 limits the stroke of the piston 7. It will thus be obvious that, by changing the position of the head 28, the volume of air introduced into and withdrawn from the tube 3 may be varied at will but unless so varied will remain constant.

The adjustment of the head 28 is made by means of a hollow rod 29 secured to the head 28 and opening into the interior of the cylinder 10. The exterior surface of the rod 29 is threaded and in engagement with a hand wheel 30 by which it may be turned.

The rod 29, being hollow, is connected into the conduit 12 by a coupling 31 and serves as an inlet port for the conduit 12 into the cylinder 10. The conduit 11 is connected into the cylinder 10 by a port 32 at the upper end of the cylinder and on the side of the piston 9 opposite the opening of the rod or conduit 29.

As previously explained the conduits 11 and 12 are opened by valves to a source of compressed air and to the atmosphere by timing mechanism in proper time relationship to the operation of the shears 5.

In my Patent No. 1,686,109, issued October 2, 1928, I have described in connection with a pump of the character herein described, means for breaking the pressure tube to atmosphere at the end of each stroke of the pump. While that mechanism has not been described or illustrated herein, such mechanism may be used to advantage with my present invention and without departing therefrom.

So much of the mechanism and the art as we have described above is old and constitutes no part of this invention. A description of the apparatus embodying the improvements of this invention and by which the improved process may be operated will now be described.

Mechanism is provided for introducing into the conduits 11 and 12 respectively an increased supply of compressed air at particular points in the two phases of operation, that is, during the introduction of air into the tube 3 and the withdrawal of air therefrom. It will be obvious that by momentarily increasing the pressure in the conduits 11 and 12 the speed of the piston 9 and of the piston 7 will be increased and the pressure in the tube 3 will be suddenly changed thereby causing a pronounced effect upon the shape of the extruded gob B. To introduce an auxiliary supply of compressed air into the conduits 11 and 12, and thereby increase the pressure therein, there have been provided conduits 50 and 51, connected with a supply of compressed air not shown and connected respectively by poppet valves 52 and 53 to flexible tubes 54 and 55, the flexible tube 54 opening into the conduit 11 and the flexible tube 55 opening into the conduit 12.

The poppet valves 52 and 53 are opened at a particular point in the cycle of operation in accordance with the position of the piston 7 as will be described in detail. The valve 52 has a body 56 which is supported on the lower end of a screw shaft 57, passing through a bracket 58, which is secured to the pump mechanism. The rod 57 is in threaded engagement with a hand wheel 59, by which its height may be adjusted. The valve 53 is constructed and arranged similarly to the valve 52, it having a valve body 66, supported by a screw rod 67, which passes through a bracket 68 of the pump assembly and in threaded engagement with a hand wheel 69.

A rod 70 is secured to the piston 7, extends through the bottom wall of the cylinder 6 and has a cam 71 adapted to engage a roller 72 on a tappet 73, which opens the valve 52. Similarly, a rod 80 attached to the piston 7 has a cam surface 81 adapted to engage a roller 82, secured to a tappet 83, which opens the valve 53. A spring 84 returns the tappet 83 to its normal position when depressed by the downward movement of the cam 81. A hand throttle valve 85 is positioned in the tube 54 and a similar valve 86 is positioned in the tube 55.

It will now be seen that upon the downward movement of the piston 7, the poppet valve 52 will be momentarily opened, introducing an increased pressure in the conduit 11, after which it will be closed, and that upon the upward movement of the piston 7 the poppet valve 53 will be opened for a moment permitting a sudden increase in pressure on the conduit 12. Thus, during the two phases of operation the pressure in the tube 3 will be suddenly changed to give a pronounced form to the gob B.

It will also be seen that mechanism has been provided, operable by the hand wheels 59 and 69, by which this momentary change in pressure in the tube 3 can be placed at any desired point in the cycle of operation. It will also be obvious that by manipulation of the valves 85 and 86 the degree of this sudden change in pressure in the tube 3 may be accurately adjusted at will.

The rods 57 and 67 may be adjusted, and it is so intended, that the cams 71 and 81 will be effective to give a sudden increase in speed to the pump at an intermediate point in each plane of the cycle. Thus, the pump will effect a constant rate of introduction or withdrawal throughout the phase, except at an intermediate point, with a return to the normal rate for the remaining portion of the phase.

One cam has been shown on each of the rods 70 and 80, but two or more cams may be provided on a rod, when desirable to give a peculiar shape to the mold charge.

In order to control the relative speed of the introduction and withdrawal of air into and from the conduit 3, a throttling check valve 87 has been provided in the conduit 11 and a similar valve 88 has been provided in the conduit 12. It is to be understood that the valves 87 and 88 are of similar construction, the valve 88 only being shown in detail. The specific construction of such a valve is known in the art and no invention is predicated upon that construction itself but only upon its use in the combination here illustrated. It is to be understood, however, that it is so constructed as to open fully and freely in one direction, that is, in the direction of flow toward the cylinder 10 and to have an adjustable opening for the flow in the opposite direction, that is, for the exhaust. Such a valve, as specifically shown, includes a valve member 89, having a stem 90 adapted to reciprocate in a socket 91 in the valve housing. The depth of the socket 91 is such as to permit full and free opening of the valve member 89 for pressure in one direction. The extent to which the valve member 89 may be closed against its seat, with pressure in the other direction, is determined by an adjustable screw member 92.

It will thus be obvious that, by regulating the valves 87 and 88, the exhaust from the cylinder 10 may be throttled and thereby the relative speed of the piston 7 on its upward and downward strokes may be controlled. That is to say, while withdrawing the same amount of air from the tube 3 as is introduced therein during the other phase, the relative speed of such withdrawal and of such introduction, may be controlled. Or, in other words, the length of time during which the flow of the glass from the orifice 2 is retarded may be controlled with reference to the length of time during which a positive pressure impulse is given to the glass at the orifice 2. This control will be effected independently of the duration of the cycle, since the duration of the cycle is timed by other mechanism.

While it has been explained that the shape of the gob may be closely controlled by the method and apparatus above described, an added advantage has also been obtained, that of more accurately maintaining the uniform weight of the gob under varying temperature conditions of the glass than heretofore. In operation of mechanism of this character, without the improvements herein disclosed, a considerable time must be allowed for flowing, or allowing the molten glass to flow, by gravity. In actual practice, this length of time is approximately fifty per cent. of the cycle of operation. Heretofore in air feeders no means have been provided whereby the flow of glass may be under control of pressure conditions in the pressure tube during substantially the entire period of operation. To permit the molten glass to flow uncontrolled for a considerable part of the time of operation allows serious variations in the weight of the gobs due to changes in the temperature of the molten glass in the forehearth. With the improvements above described, however, the flow of glass may conveniently be placed under control of pressure conditions in the tube 3 during substantially the entire period of operation. The speed of the piston 7 may be cut below that required without the improvements, the necessary impulse to give form to the gob being supplied at a particular point in the cycle as above described in detail.

The means for controlling the shape of the gob are entirely independent of the means for controlling the weight of the gob, and thus the operation of such a device is simplified and the different adjustments may be made more accurately. The volume may be adjusted without affecting the change in shape and a change in shape may be affected without altering the weight.

It will be obvious that parts of the invention may be used without the whole, that various changes may be made in the details of construction within the scope of the appended claims, and that additions and improvements may be made without departing from the spirit of this invention.

I claim:

1. An improvement in the method of feeding mold charges of molten glass which includes extruding molten glass downwardly through an orifice and shaping the extruded glass under the influence of cyclical changes in pressure in an air column above the orifice, comprising, as a phase of each cycle, withdrawing air from the column at a uniform rate, except and with a pronounced increase in the rate of withdrawal at an intermediate point in the phase, returning to the usual rate of withdrawal for the remaining portion of the phase.

2. An improvement in the method of feeding mold charges of molten glass which includes extruding molten glass downwardly through an orifice and shaping the extruded glass under the influence of cyclical changes in pressure in an air column above the orifice, comprising, as a phase of each cycle, introducing air into the column at a uniform rate, except and with a pronounced increase in the rate of introduction at an intermediate point in the phase, returning to the usual rate of introduction for the remaining portion of the phase.

3. An improvement in the method of feeding mold charges of molten glass which includes extruding molten glass downwardly through an orifice and shaping the extruded glass under the influence of cyclical changes in pressure in an air column above the orifice, comprising, as a phase of each cycle, withdrawing a uniform quantity of air from the column during each cycle at a uniform rate, except and with a sudden increase of the rate of withdrawal at a selected point in the phase, and adjusting the shape of the extruded glass by adjusting the phase relationship of such selected point of increase in rate independently of the rate of withdrawal during the remaining portion of the withdrawal phase and independently of the volume of withdrawal.

4. An improvement in the method of feeding mold charges of molten glass which includes extruding molten glass downwardly through an orifice and shaping the extruded glass under the influence of cyclical changes in pressure in an air column above the orifice, comprising, as a phase of each cycle, introducing a uniform quantity of air into the column during each cycle at a uniform rate, except and with a sudden increase in the rate of introduction at a selected point in the phase and adjusting the shape of the extruded glass by adjusting the phase relationship of such selected point of increase in rate independently of the rate of introduction during the remaining portion of the phase and independently of the volume of introduction.

5. In glass feeding mechanism having a pressure tube above a discharge orifice, a reciprocating pump adapted to deliver to and withdraw from the pressure tube a predetermined quantity of air in successive cycles, means for accelerating the operation of the pump, and cam mechanism reciprocated by the pump and adapted to engage and actuate such means.

6. In glass feeding mechanism having a pressure tube supported above a discharge orifice, a reciprocating pump adapted to deliver to and withdraw from the pressure tube a predetermined quantity of air in successive cycles, means for accelerating the operation of the pump, cam mechanism reciprocated by the pump and adapted to engage and actuate said means, and an adjustable support for said means whereby it may be selectively positioned for engagement by the cam mechanism to accelerate the operation of the pump at a selected point in the cycle.

7. In glass feeding mechanism having a pressure tube supported above a discharge orifice, a reciprocating pump adapted to deliver to and withdraw from the pressure tube a predetermined quantity of air in successive cycles, fluid pressure means for operating said pump, a valve for introducing an increased pressure into said means and thereby accelerate the operation of the pump, cam mechanism reciprocated by the pump and adapted to engage and operate said valve, and means for selectively adjusting the respective positions of the cam and valve whereby the pump may be accelerated at a selected point in its cycle of operation.

8. In glass feeding mechanism having a pressure tube supported above a discharge orifice and a reciprocating pump adapted to successively deliver a predetermined quantity of air to the tube as phases of timed cycles, the improvement comprising means for accelerating the compression stroke of the pump at a particular point in the phase, and means for adjusting the point in the phase at which such acceleration occurs independently of the duration of the cycle and relationship of the phases.

9. In glass feeding mechanism having a pressure tube supported above a discharge orifice and a reciprocating pump for successively withdrawing a predetermined quantity of air from said tube as a phase of timed cycles, the improvement comprising mechanism for accelerating the suction stroke of the pump at a particular point in the phase, and means for adjusting the mechanism at will to operate at any one of a plurality of selected points in the phase independently of the duration of the cycle and relationship of the phases.

10. In glass feeding mechanism having a pressure tube supported above a discharge orifice and a reciprocating pump adapted to deliver to and withdraw from the pressure tube a uniform and predetermined quantity of air as separate phases in successive cycles, the improvement comprising mechanism for accelerating the stroke of the pump at one or more selected points in its cycle of operation, and means for adjusting the position of such points in the cycle independently of the duration of the cycle and the relationship of the phases.

SAMUEL G. STUCKEY.